(12) United States Patent
Chi (10) Patent No.: US 9,210,399 B1
(45) Date of Patent: Dec. 8, 2015

(54) WEARABLE DEVICE WITH MULTIPLE POSITION SUPPORT

(75) Inventor: Liang-Yu Chi, San Francisco, CA (US)

(73) Assignee: Google Inc., Mountain View, CA (US)

(*) Notice: Subject to any disclaimer, the term of this patent is extended or adjusted under 35 U.S.C. 154(b) by 586 days.

(21) Appl. No.: 13/566,644

(22) Filed: Aug. 3, 2012

(51) Int. Cl.
*H04N 7/18* (2006.01)
*H04N 13/00* (2006.01)

(52) U.S. Cl.
CPC .................................. *H04N 13/0022* (2013.01)

(58) Field of Classification Search
CPC .. G02B 27/01; G02B 27/017; G02B 27/0172; G02B 27/0176; G02B 2027/0132; G02B 2027/0156; G02C 11/00
USPC ......................... 348/42, 43, 51–53, 143, 158
IPC ........................................................ H04N 7/18
See application file for complete search history.

(56) References Cited

U.S. PATENT DOCUMENTS

| 4,917,479 | A | * | 4/1990 | Bidgood | 351/123 |
| 5,483,303 | A | * | 1/1996 | Hirschman | 351/118 |
| 6,990,981 | B2 | * | 1/2006 | DuBois et al. | 128/858 |
| 8,957,835 | B2 | * | 2/2015 | Hoellwarth | 345/8 |
| 2002/0089469 | A1 | * | 7/2002 | Cone et al. | 345/8 |

* cited by examiner

*Primary Examiner* — Trang U Tran
(74) *Attorney, Agent, or Firm* — Lerner, David, Littenberg, Krumholz & Mentlik, LLP (57) ABSTRACT

A head-wearable device includes a support structure having a center support with a nosepiece configured to rest on the nose of a user. A first side arm extends from a first end of the center frame support, and an earpiece extends therefrom. The earpiece defines a first portion adjacent the side arm and a second portion remote from the side arm. A display is affixed to the support structure and is positionable adjacent an eye of the user. The device is configured to be wearable in a first position with the first portion of the earpiece in contact with the ear of the user and the display positioned above a center of a line of sight of the user and in a second position with the second portion of the earpiece in contact with the ear and the display positioned over the center of the line of sight.

21 Claims, 9 Drawing Sheets

WEARABLE DEVICE WITH MULTIPLE POSITION SUPPORT

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms.

BRIEF SUMMARY

An aspect of the present disclosure relates to a head-wearable device. The device includes a support structure having a center support with a nosepiece affixed thereto. The nosepiece is configured to rest on the nose of the user with the central portion being supported over the brow of the user. The support structure also has a first side arm extending from a first end of the center frame support. An earpiece extends from the first side arm and is configured to extend behind the ear of the user on the side of the first side arm. The earpiece defines a first portion adjacent the side arm at a first distance from the center support and a second portion remote from the side arm and at a second distance from the center support that is greater than the first distance. The device also includes a display affixed to the support structure so as to be positionable adjacent an eye of the user. The display is configured to present information to the user. The device is configured to be wearable on the head of the user in a first position with the first portion of the earpiece in contact with the ear of the user and the display positioned above a center of a line of sight of the eye of the user and in a second position with the second portion of the earpiece in contact with the ear of the user and the display positioned over the center of the line of sight.

The first distance can be such that the nosepiece contacts the nose of the user at a first location when the device is in the first position and such that the nosepiece contacts the nose of the user at a second location when the device is in the second position. In such an example, the first location can be closer to the eyes of the user than the second location. In a further example, the display can include a viewing surface, and the first position can be such that the viewing surface is positioned at a first angle with respect to the eye of the user and the second position can be such that the viewing surface is positioned at a second angle with respect to the eye. The first angle can be perpendicular to a line from the viewing surface to the focal center of the eye when the device is in the first position, and the second angle can be perpendicular to a line from the viewing surface to the center of the eye when the device is in the second position.

In an example, the earpiece can be continuously curved between the first and second portions. Further, the earpiece can include a high-friction material over at least the second portion thereof. Additionally or alternatively, the earpiece can include a plurality of ribs oriented generally perpendicular to a direction of the earpiece. Such ribs can be positioned within the second portion of the earpiece. In such an example, the second portion of the earpiece can extend along the earpiece at a length such that the second portion can contact the ear in a plurality of sub-positions. In another example, the earpiece can include a notch disposed between the first and second positions. The notch can be configured to contact the ear of the user along a top portion thereof when the second portion of the earpiece is also in contact with the ear of the user. In any example, the earpiece can be adjustably affixed with the first side arm such that the first and second distances can be adjusted to configure the device to be wearable in the first and second positions.

In an example of the device, the display can be affixed to the support structure to be positioned adjacent the first end of the center support. The device can further include an extension arm affixed to the support structure so as to extend at least partially along the first side arm on a first side of the center support and to further extend from the first side arm to a display end that to which display is affixed in a position on a second side of the center support. The extension arm can further include a camera located therealong so as to be aligned with the display when the device is in either the first position or the second position. The extension arm can include an input device configured to receive an input from the user, the input being related to information presentable on then display.

In a further example, the earpiece can be included in a housing unit configured for retaining one or more electronic components of the device. The electronic component can include circuitry for connecting a battery with one or more other electronic components of the device.

The nosepiece can include two support arms configured to contact the nose on opposing sides thereof. In such an example, the support arms can be adjustable so as to be positionable closer together and farther apart and such adjustment can be used to configure the device to be wearable in the first and second positions.

Another aspect of the present disclosure can relate to a head-wearable device. The device includes a center support having a nosepiece affixed thereto. The nosepiece is configured to rest on the nose of the user with the central portion being supported over the brow of the user. A first side arm extends from a first end of the center frame support. An earpiece extends from the first side arm and is configured to extend behind the ear of the user on the side of the first side arm. The earpiece defines a first portion adjacent the side arm at a first distance from the center support and a second portion remote from the side arm and at a second distance from the center support that is greater than the first distance. A display is affixed to the support structure so as to be positionable adjacent an eye of the user. The display is configured to present information to the user. The device is configured to be wearable on the head of the user in a first position with the first portion of the earpiece in contact with the ear of the user and the display in a first vertical position with respect to the eye and a second position with the second portion of the earpiece in contact with the ear of the user and the display in a second vertical position with respect to the eye, the first position being higher than the second position.

The first vertical position can be such that the eye of the user must be directed upward to focus on information presentable in the display, and the second position can be such that the eye can focus on information presentable on the display when centrally oriented.

The first vertical position can be configured such that information presentable on the display does not obstruct the user's vision, and the second vertical position can be configured such that information presentable on the display can be comfortably viewed by the user for more than 90 seconds.

Another aspect of the present disclosure can relate to a head-wearable device. The device can include a support structure having a center support with a nosepiece affixed thereto. The nosepiece can be configured to rest on the nose of the user with the central portion being supported over the brow of the user. The support structure can further include a first side arm extending from a first end of the center frame support and a housing from the first side arm and including an earpiece extending configured to extend behind the ear of the user on the side of the first side arm. The earpiece defines a first portion adjacent the side arm at a first distance from the center support and a second portion remote from the side arm and at a second distance from the center support that is greater than the first distance. The housing is further configured to retain an electronic component therein. The device further includes an extension arm affixed to the support structure so as to extend at least partially along the first side arm on a first side of the center support and to further extend from the first side arm to a display end including a display thereon in a position on a second side of the center support. The display is positionable adjacent an eye of the user. The device is configured to be wearable on the head of the user in a first position with the first portion of the earpiece in contact with the ear of the user and the display in a first vertical position with respect to the eye and a second position with the second portion of the earpiece in contact with the ear of the user and the display in a second vertical position with respect to the eye, the first position being higher than the second position.

DETAILED DESCRIPTION

Figure 1:
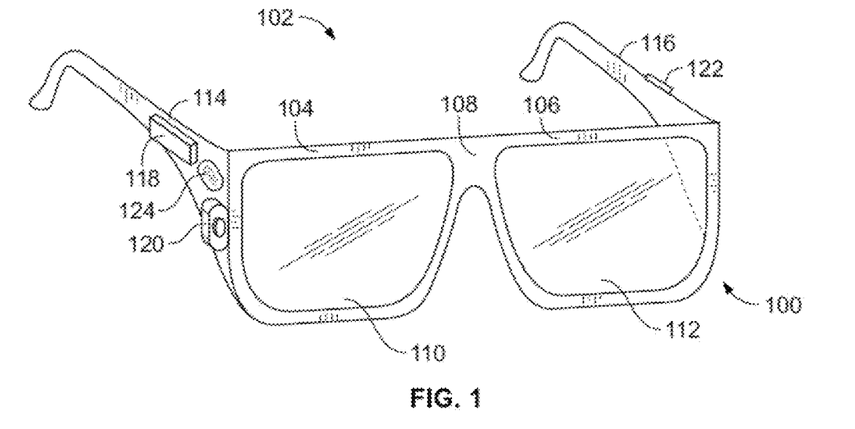
FIG. 1 shows an exemplary system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire—or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
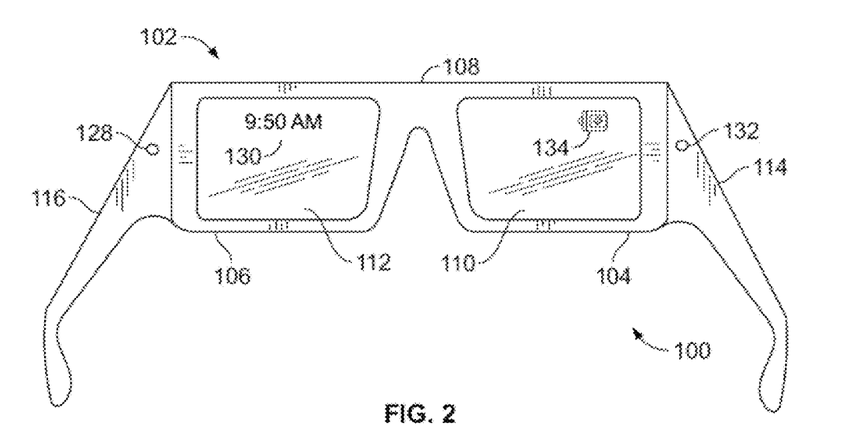
FIG. 2 shows an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
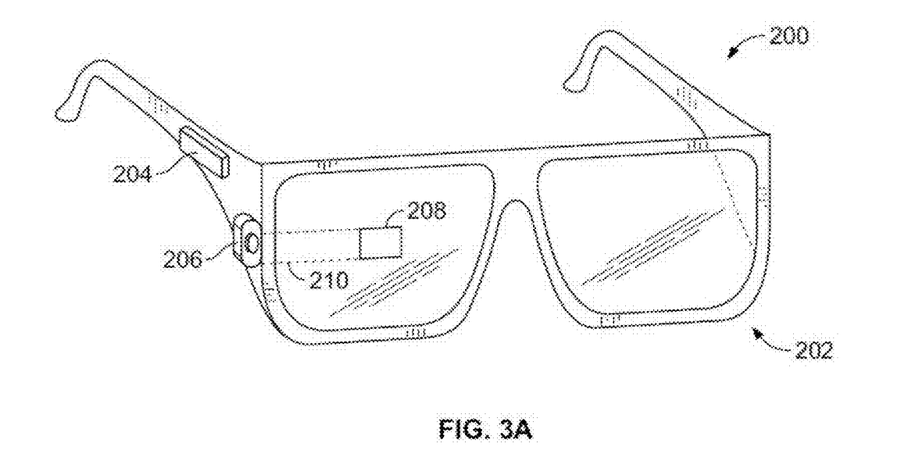
FIG. 3A shows an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
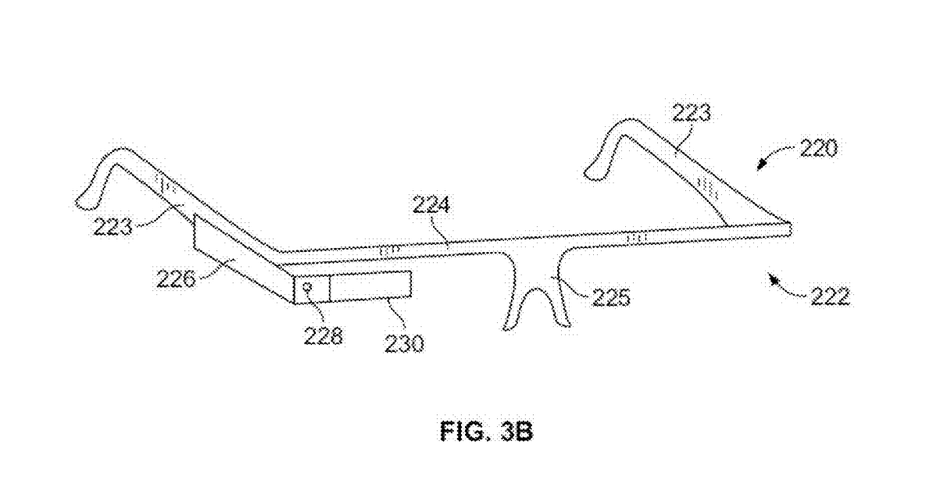
FIG. 3B shows an example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
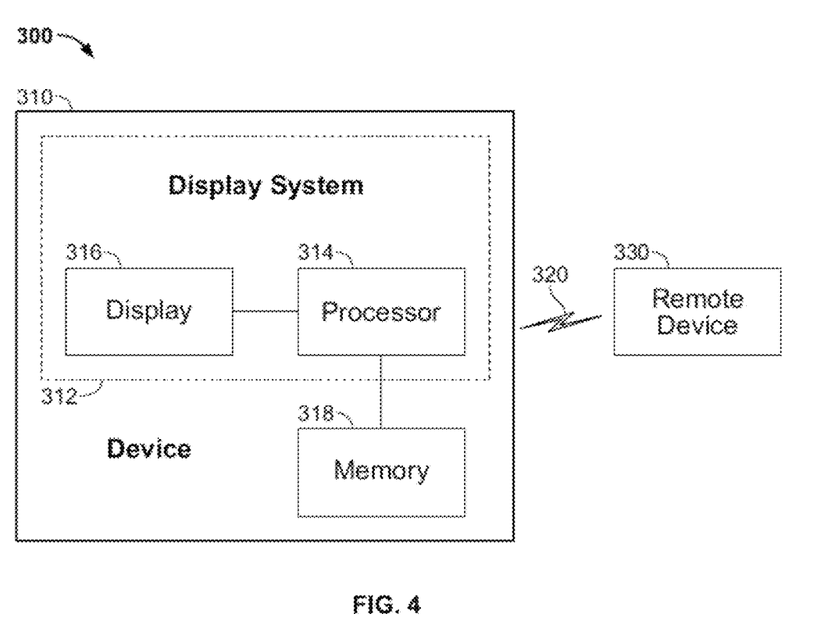
FIG. 4 shows an example system for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
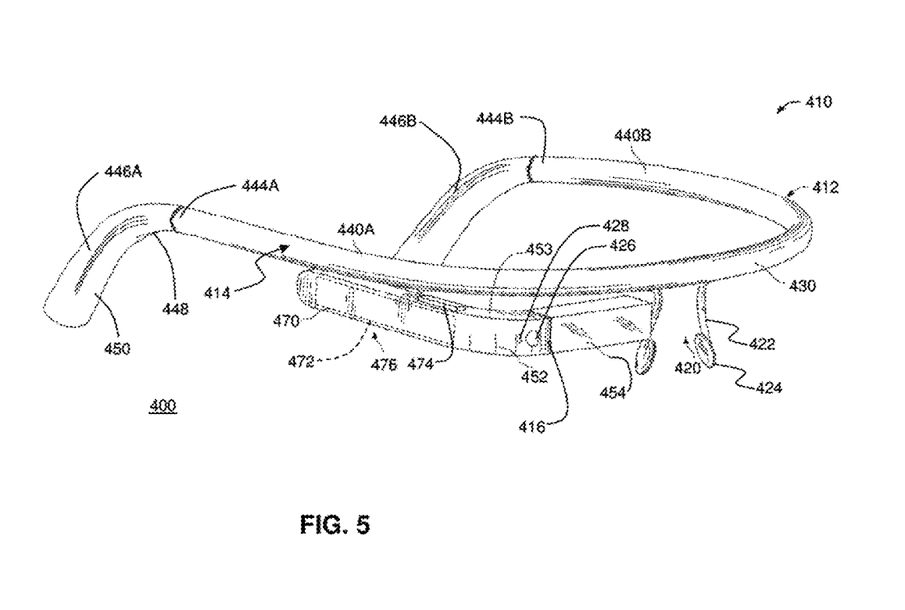
FIG. 5 shows a wearable display device according to an embodiment of the disclosure.

FIG. 5 illustrates an example system 400 for receiving, transmitting, and displaying data according to aspects of the disclosure. The system 400 is a wearable computing device and includes many of the same components included in the configurations described above. The device 410 shown in FIG. 5 is configured to be wearable on the head of the user. As will be described in greater detail below, device 410 includes a band 412 that provides a desired fit of device 410 on a user's head. Device 410 further includes an extension arm 414 that extends from a portion of band 412 to a display end 416 thereof that includes a display element 454. Extension arm 414 is configured such that, when device 410 is worn by a user, display 454 mounted on extension arm 414 can be positioned adjacent the user's eye, within the user's line of sight of at least that eye, for making an image presented thereon viewable by the user. In this manner, the extension arm 414 is configured to carry out at least one operation of the device 410, namely presenting an image to the user. Additional operations can also be carried out through extension arm 414, which can also include an input device in the form of a touch-based input 470 that is accessible to the user to execute a touch input gesture to execute a control function of the device assembly 410 or a function of another electronic device that is connected or in communication with device assembly 410.

Band 412 is shown in FIG. 5 as including a central portion 430 with side arms 440A,440B extending away from opposite sides of the central portion 430. Central portion 430 includes nosepiece 420 configured to rest on the nose of a wearer with the central portion 430 providing a central support for side arms 440A,440B, which can extend unitarily therefrom, or can at least appear to extend unitarily therefrom, with an area of transition between the central portion 430 and the side arms 440A,440B including a bend or curve therebetween. Nosebridge 420 can include a pair of bridge arms 422 that extend from the central portion 430. In the view of the embodiment of device assembly 410 shown in FIGS. 5 and 6, bridge arms 422 extend in a downward direction from central portion 430. As in other figures, the orientation of device assembly 410 shown in FIG. 5 generally corresponds to the orientation of device 410 when being worn by a user when the user's head is in a neutral, upright position. The description of bridge arms 422 extending downward from central portion 430 is made in such a reference frame and is done for purposes of the present description. Discussion of any other relative reference directions is also made for similar purposes and none are intended to be limiting with respect to the present disclosure, unless explicitly stated.

Bridge arms 422 can include respective pads 424 thereon, which can be positioned to rest on parts of the nose of the wearer. Pads 424 can be made of a material that is softer than arms 422 for purposes of comfort. Additionally, the material that pads 424 are made from can be flexible or have a texture that prevents slippage along the surface of the user's nose. Bridge arms 422 can be flexible to further provide a comfortable fit and or grip on the user's nose. Further, bridge arms 422 can be bendable and repositionable so that the position of pads 424 can be changed to best fit the user. This can include movement closer together or farther apart or fore and aft relative to central portion 430, which can adjust the height of central portion 430 and, accordingly, the position of extension arm 414 and its display 454 relative to the user's eye.

Further adjustment of display and other structures thereof can be similar to those in the embodiments described above, as can the structures used to affix extension arm 414 to band 412. In other embodiments, structures similar to arms and pads can be integrally formed with central portion 430 and can be structured such that larger or smaller areas of the nosebridge 420 contact the nose of the user, compared to the embodiment shown. Accordingly, device 410 can be worn on a user's head such that nosepiece 420 can rest on the user's nose with side arms 440A,440B extending over respective temples of the user and over adjacent ears. The device 420 can be configured, such as by adjustment of bridge arms 422 such that display element 454 is appropriately positioned in view of one of the user's eyes. In one position, device 410 can be configured to fit on the user's head with bridge arms 422 being adjusted to position display 454 in a location within the user's field of view, but such that the user must direct her eyes upward to fully view the image on the display. Such a configuration can be useful to have information presented on display 454 visible to the user but not positioned so as to block the user's view of her surroundings, for example. Device 410 is shown with display 454 in such a position on a user's head in FIG. 6.

Figure 6:
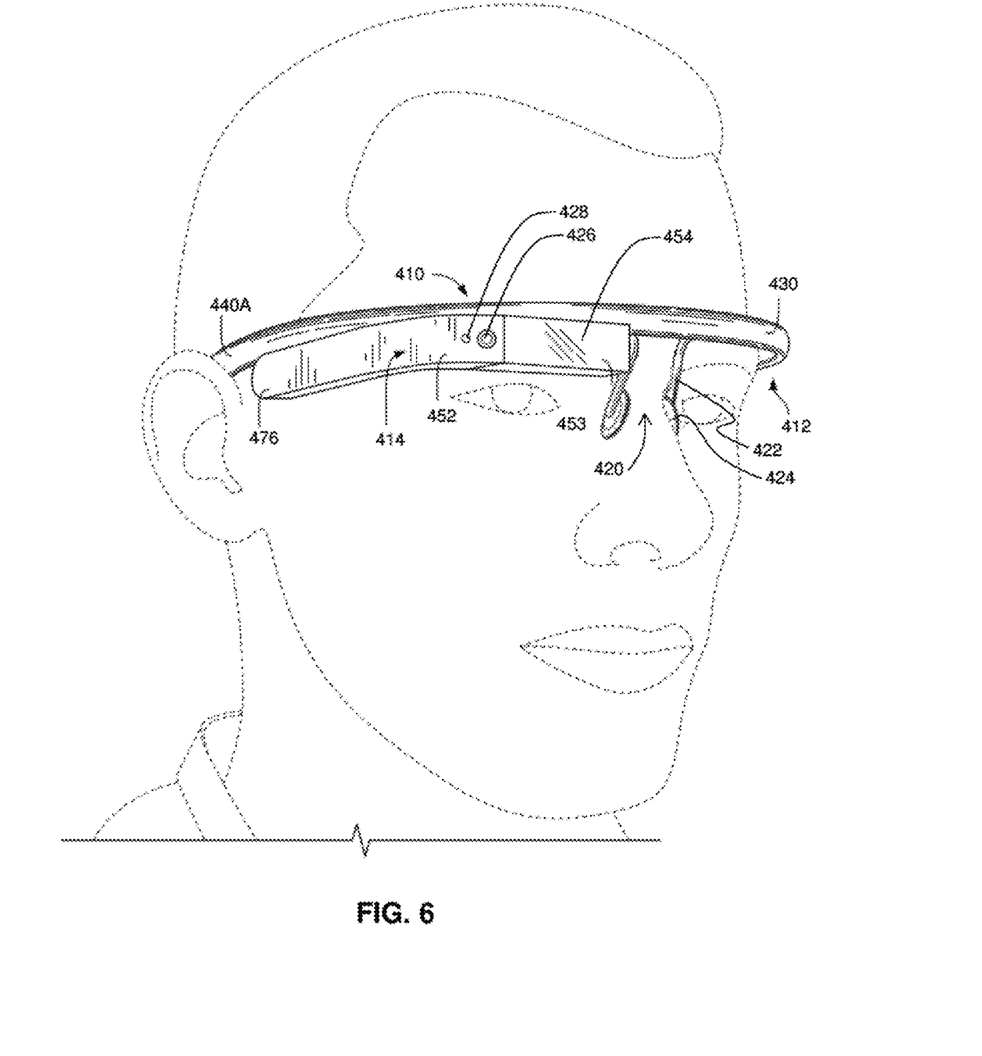
FIG. 6 shows the device of FIG. 5 in being worn in a first position on the head of a user.

Side arms 440A,440B can be configured to contact the head of the user along respective temples or in the area of respective ears of the user. Side arms 440A,440B include respective free ends 444 opposite central portion 430. Free ends 444 can be positioned to be located near the ear of a user when wearing device 410. As shown in FIG. 6, the center portion 430 and side arms 440A,440B may generally have a "U" shape.

Earpieces 446 can be configured to help position device 410 on the head of the user in multiple positions. As discussed above with respect to FIG. 6, it may be advantageous to configure device 410, including band 414, and more particularly including side arms 444 and earpieces 446 to allow device 410 to be positionable in a first position shown in FIG. 6 wherein display 545 is viewable by the user but not within the user's direct line of sight when the user's eyes are in a neutral (i.e. centered or directly forward-looking) position. This can be useful, for example when display 454 is being used by device 410 to present information that requires only a quick glance for the user to view. In an example, display 454 can be located, when device 410 is in the position shown in FIG. 6, such that the user must direct his vision upward (and optionally laterally outward as well) to view information presented on display 454. In some instances, this upward direction of the user's eye may be sufficient to cause a tear-break between the eye and the eyelid. This can occur when a portion of the lens of the eye within about the middle third thereof is positioned along the lower edge of, for example, the upper eyelid. This can allow air to pass under the eyelid, causing uncomfortable dryness after a period of time, e.g. over about 90 seconds, depending on the individual and the ambient conditions. Even in the absence of such a tear break or associated dryness, the act of directing one's eyes to view display 454 when in such a position can cause strain after more than a quick glance, making lengthy viewing uncomfortable.

To alleviate such potential discomfort when the user is viewing display for a significant period of time (e.g., when viewing an email or other passage of text or the like), device 410 can further be configured to be positionable on the user's head in a second position such that the display 454 is directly within the user's line of sight when the user's eye is in a neutral, or forward-looking position. As illustrated using a simplified depiction of device 410 illustrated in FIGS. 7 and 8, such a position can be achieved by sliding nosebridge 420, including bridge arms 422A,422B and pads 424A,424B downward along the user's nose. By such re-positioning, the central portion 430 of band 412 will move downward by a corresponding distance, thereby repositioning display 454 accordingly.

Earpieces 446A,446B can be configured to facilitate such an arrangement. In an the simplified example shown in FIGS. 7 and 8, earpiece 464A can be configured such that the portion thereof that is configured to extend over ear and to hook at least partially behind the ear includes two portions thereof. As shown, first portion 448 can be configured to contact a portion of the ear 2 when the device in the first position shown in FIG. 7. As further shown, the first position can be such that a portion of the side arm 444A near earpiece 446 can contact the ear of the user as well. The contact between side arm 444A and the ear can be along the attachment of the ear 2 to the adjacent portion of the side of the head (as indicated by line 3) near the top or apex thereof. First portion 448 can be positioned at least somewhat around the back of the ear 2 such that first portion 448 can help to prevent unwanted sliding of nosebridge 420 downward on the user's nose 4 to maintain the device in the first position of FIGS. 6 and 7.

Figure 8:
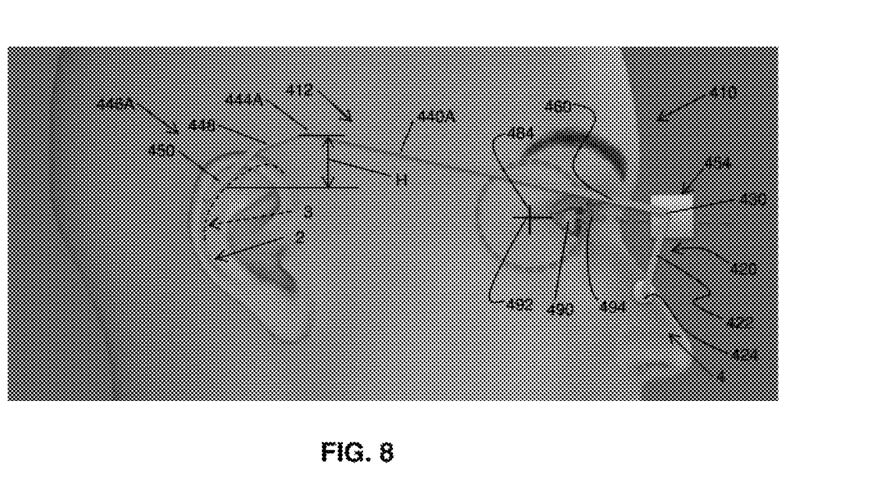
Figure 9:
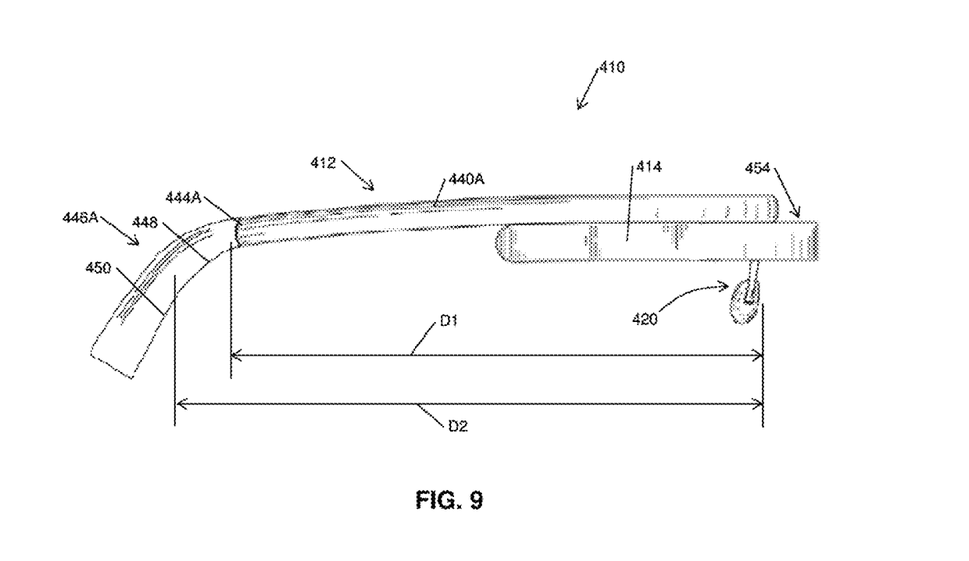
FIG. 9 shows a side elevational view of the device of FIG. 5.

Earpiece 446A can further include a second portion 450 that is positioned remote from side arm 444A with first portion 448 therebetween. As illustrated in FIG. 8, second portion 450 can be positioned with respect to side arm 444A such that it can contact ear 2 with device 410 in the second position near the same point of contact that first portion 448 makes with ear 2 in the first position. To achieve this, first portion 448, for example, can be at a length sufficient to position second portion 450, which extends therefrom, at a distance D2 (shown in FIG. 9) from a horizontal position of nosebridge 420. The distance D2 can be greater than the distance D1 between first portion 448 and nosebridge 420 by an amount sufficient to allow forward movement of nosebridge 420 through a distance to cause nosebridge 420 to sit lower on the user's nose 4 at a distance sufficient to reposition display 454 in front of the user's eye, as illustrated in FIG. 9. In an example, the difference between D1 and D2 can be between about X mm and Y mm.

Figure 7:
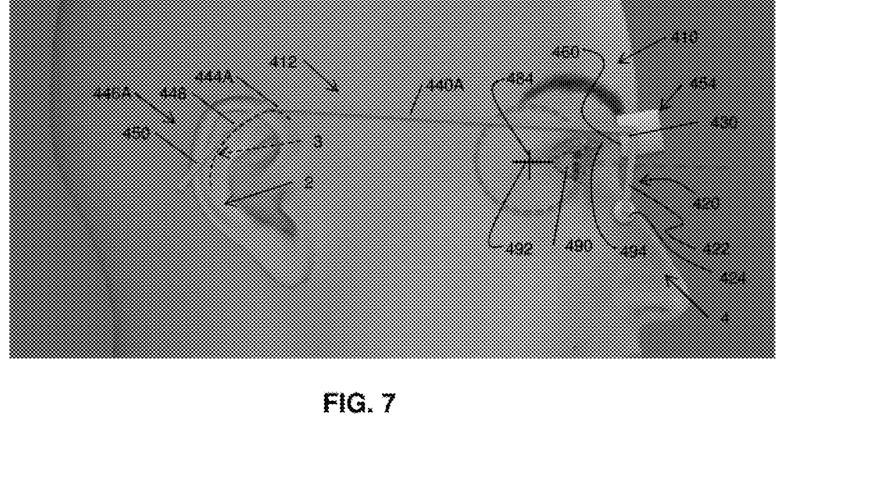
FIGS. 7 and 8 show the a diagrammatic depiction of a wearable display device being worn in different positions on the head of a user.

Second portion 450 can further be angled relative to first portion 448 such that when device 410 is in the second position second portion 450 is positioned somewhat behind the ear 2. In an example, the angle between first portion 448 and second portion 450 can be between about X degrees and Y degrees. This can prevent nosebridge from further unwanted slipping down the user's nose 4. The transition between first portion 448 and second portion 450 can be abrupt, as shown in FIGS. 7 and 8 or can be generally smother, as shown in the example of FIG. 9. Further, earpiece 446 can be moveable along side arm 444, such as by a sliding or telescoping arrangement, such that earpiece 446 can be adjusted based on the position of the user's ears or the shape of the user's nose, for example, to allow a fit of device 410 in the first and second positions, as discussed above.

As further illustrated in FIGS. 7 and 8, when device 410 is in the second position, first portion 458 can be moved out of contact with the ear 2. This can be caused by upward rotation of side arm 444, which can cause overall rotation of device 410 such that display also rotates, while moving downward as device 410 is moved from the first position to the second position. In an example, the end of side portion 444A, adjacent earpiece 446A can be between about X mm and Y mm higher, along height H, relative to the ear 2 in the second position compared to in the first position.

In some examples of device 410, such as those with certain display configurations (including the use of some types of prisms), it can be advantageous to orient display 454 such that viewing surface 460 is normal to a line from the image location within display 454 to the focal center of the user's eye. The above-described configuration of band 412 and in particular earpieces that results in rotation of display housing 475 and, thus, display 454 during movement of the device from the first position to the second position can cause the display 454 to be positioned in an optimal angle for viewing in either position. FIGS. 7 and 8 show display 454 at a location above the horizontal center 492 of the user's eye 490. During such repositioning, device 410, and thus display 454, can effectively be pivoted or otherwise rotated about axis 484 that extends in a lateral direction relative to the user's face (in and out of the page of FIG. 7) such that surface 460 is perpendicular to a line 494 extending between surface 460 and the focal center 496 of the user's eye 490. It is noted that the diagrams shown in FIGS. 7 and 8 are only examples and that different users can have different locations of their eye's focal center. FIG. 8 shows display 454 positioned vertically near the horizontal center 492 of the user's eye with display rotated accordingly for optimal viewing by the user, as described above.

Figure 10:
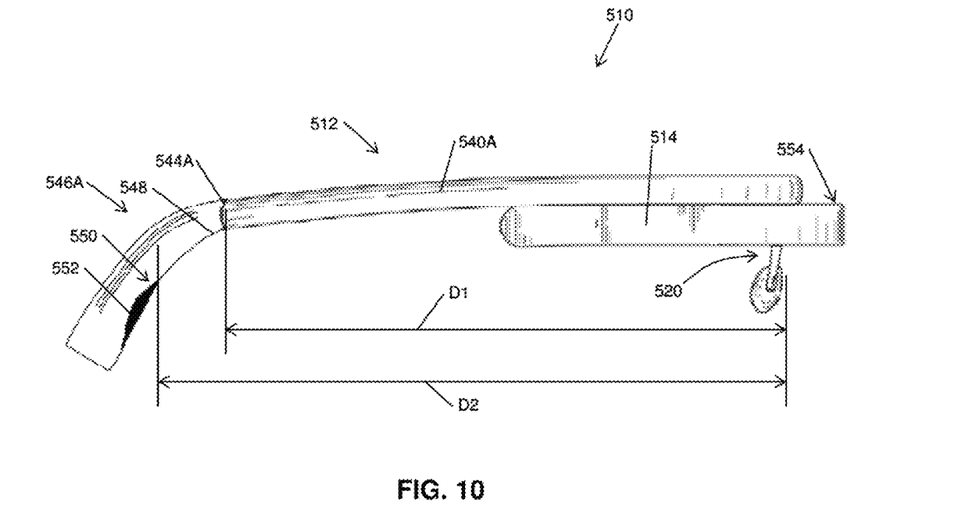
FIG. 10 shows a side elevational view of another example of a wearable display device.

Either or both earpieces can be configured to further facilitate both the ability of either or both of the earpieces to help retain device in the second position and to provide tactile feedback for the user when positioning the device. In the example of FIG. 10, earpiece 546A can include an elastomeric insert 562 within second portion 450. Elastomeric insert 562 can be configured to provide friction between second portion 550 and ear 2 along the point of contact therebetween when device 510 is in the second position. Further, insert 562 can be compressible such that insert 562 partially encircles ear 2 when device 510 is in the second position to provide additional retention of device 510.

Figure 11:
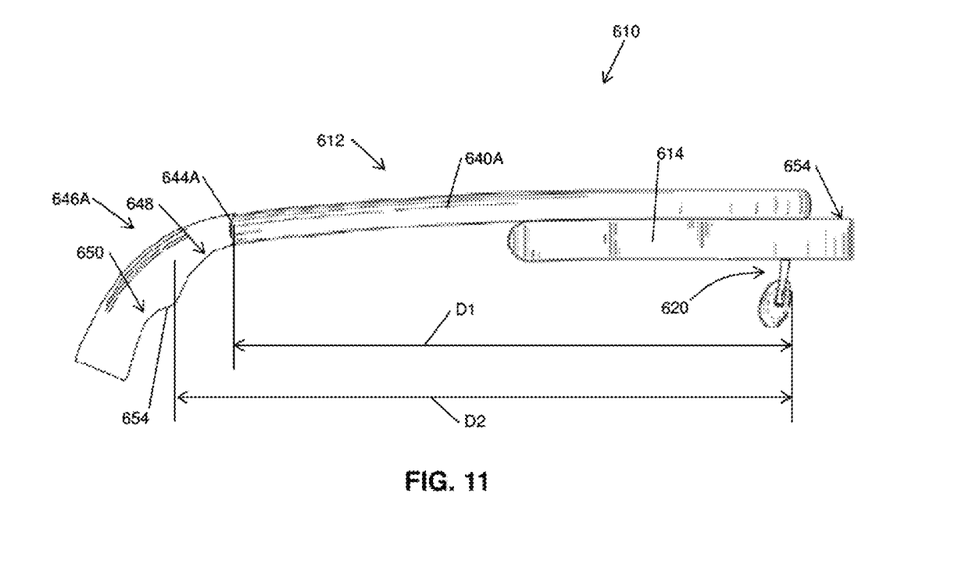
FIG. 11 shows a side elevational view of another example of a wearable display device.

In another example shown in FIG. 11, earpiece 646 can include a notch 664 between first portion 648 and 650. Notch 664 can be positioned so as to rest on the top of the attachment between ear 2 and the side of the user's head (as illustrated in FIGS. 7 and 8) so as to prevent device 610 from slipping into the first position. The location of notch 664 can also be configured to make it easier for the user to locate device 610 in the second position by giving feedback as to the appropriate location for earpiece 646 on the ear, which can allow for nosebridge 620 to be automatically positioned in the desired location on the nose.

Figure 12:
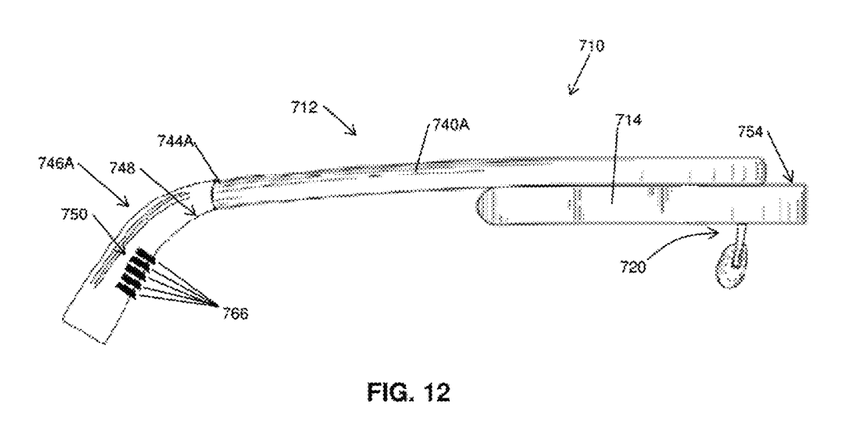
FIG. 12 shows a side elevational view of another example of a wearable display device.

Further, earpiece 746 shown in the example of device 710 of FIG. 12 can include a plurality of ribs 766. The ribs 766 can provide functionality that is a combination of notch 664 and insert 562 discussed in previous examples. That is, ribs 766 can be of an elastomeric material, such as thermoplastic elastomer, rubber, or the like to provide friction between earpiece 746 and the ear. Further ribs 766 can provide for a plurality of features that can grip the ear along various locations thereof. This can also provide a plurality of different locations for earpiece 746 to anchor to the ear, which can allow for a plurality of sub-positions within the second position, thereby allowing the user an ability to micro-adjust the location of display 754 in front of the eye, as desired for the second position.

Any of the above-described characteristics of the earpiece of the device can be applied to either one or both of the earpieces to facilitate such positioning. In an example, only the earpiece on the side of the display may need to be configured with multiple positions or related positioning features to allow the device to be securely worn in the second position.

Either or both of the earpieces 446A, 446B may be enlarged to house circuitry and/or a power supply (e.g., removable or rechargeable battery) for the system 400. In an example, earpiece 446A can be configured to include circuitry and/or a power supply, while earpiece 446B can include no such internal components. Such an arrangement can be used to provide desired balancing characteristics for band 412 with respect to extension arm 414 or the like. The configurations of the two free ends 444A, 444B may be switched so that earpiece 446B houses circuitry and/or power supply equipment. In another example, the U shape of band 412 can be asymmetric. Such an asymmetry can be due, in part, to different configurations of the earpieces 446A and 446B, or the absence of an earpiece from one of the side arms 440A or 440B. In such an example, side arm 440B can terminate at free end 444B such that an earpiece is not attached thereto and such that side arm 440A includes an earpiece 446A that can be configured as a component housing.

Either or both earpieces 446 can be configured and positioned to provide a balancing weight to that of extension arm 414. Extension arm 414 is positioned forward of the user's ear, which can cause a portion of its weight to be supported over the brow of the user. By adding weight behind the user's ear (or shifting weight to behind the user's ear) in the form of earpiece 446, the ear becomes a fulcrum about which the weight of extension arm 414 is balanced against that of the earpiece 446. This can remove some of the weight on the user's nose, giving a more comfortable, and a potentially more secure fit with reduced potential slipping of nosepiece 420 downward on the user's nose. The components within earpiece 446, such as a battery or various control circuitry can be arranged to contribute to a desired weight distribution for device 410. For example, heavier components, such as a battery, can be placed toward or away from extension arm 414 on side arm 440A to adjust the weight distribution. In an embodiment, a majority of the weight can be carried by the ear of the user, but some weight can still be carried by the nose in order to give the device a secure feel and to keep the central portion 430 in a desired position over the brow to maintain a desired position for display 454. In an embodiment, between 55% and 90% of the weight of device assembly 410 can be carried by the user's ear.

Band 412 can be configured to resiliently deform through a sufficient range and under an appropriate amount of force to provide a secure fit on user's heads of various sizes. In an example, band 412 is configured to comfortably and securely fit on at least about 90% of adult human heads. To accomplish this, as illustrated in FIG. 9, band 412 can be structured to elastically deform (or resiliently deform) such that the distance 496 between free ends 444A and 444B can increase under force from an initial, or unflexed distance $496_1$ by at least 40% and up to about 50% to a flexed distance $496_2$. In other examples, distance $496_1$ can increase by more than 50%. The original distance $496_1$ between free ends 444A and 444B can be configured to be undersized relative to the smallest head size that band 412 is intended to be worn on such that distance 496 will increase at last somewhat (for example, by about 5%) so that the flexing of free ends 444A and 444B away from each other when worn even by users having small head sizes causes some pressure to be applied to the sides of the user's head.

As shown in FIG. 5, side arm 440A can include an arched or curved section, such that it bends along a portion of the back of the user's ear. As with eyeglasses, the particular shape of such a bend can vary in many ways including in the size of the bend, the distance around the ear which it extends and the amount of contact, if any, actually maintained with the outside of the ear. The bend 446 in side arm 440A can blend into a continuing shape formed in the enlarged free end 444A and can be configured such that the enlarged free end 444A can be positioned in contact with a portion of the user's head behind the adjacent ear. The bend 446 can further be resiliently deformable such that different sizes and shapes of head can be accommodated by such a fit.

Extension arm 414 includes a first portion 476 that extends downward from band 412 at a first portion 476 that can be shaped to also extend along a length of band, such as along side arm 440A. First portion 476 is further shaped to extend away from band 412 to an elbow portion 452 connected with first portion 476 by a joint 456. Elbow portion 452 supports display 454 at an angle relative to arm 476. Display 454, which is elongated and generally defines a display axis, can extend relative to first portion 476 at an angle, for example, from about 80° to about 125°. Extension arm 414 can be positioned vertically below band 412 such that band 412 can remain out of the user's line of sight while display 454 is visible to the user.

In an embodiment, the image source associated with display 454 and its related circuitry can be held within elbow portion 452. Circuitry for a touch-based input 470 can be positioned within first portion 476 such that, when display 454 is positioned over a user's eye, first portion 476 is positioned in a position that extends over the user's temple adjacent that eye.

In the embodiment shown, display 454 is in the form of a generally transparent prism that is configured to overlay or combine with the user's sight an image generated by electronic display components that are positioned within the housing 452. Such a prism can be structured to receive a projected image in a receiving side 458 and to make that image visible to a user by looking into a viewing side 460 of display 454. This can be done by configuring display 454 with a specific shape and or material characteristics. In the example shown, the receiving side 458 of display 454 is adjacent to or within housing 452 such that the electronic components inside housing 452 can contain a video projector structured to project the desired video image into receiving side 458 of prism 454. Such projectors can include an image source such as LCD, CRT, and OLED displays and a lens, if needed, for focusing the image on an appropriate area of prism 454. The electronic components associated with display 454 can also include control circuitry for causing the projector to generate the desired image based on a video signal received thereby. Other types of displays and image sources are discussed above and can also be incorporated into extension arm 414. Further, a display can be in the form of a video screen consisting of, for example, a transparent substrate. In such an example, the image generating means can be circuitry for a LCD display, a CRT display or the like positioned directly behind the screen such that the overall display is not transparent. The housing of the extension arm 414 can extend behind the display and the image generating means to enclose the image generating means in such an embodiment.

The receiving surface 458 of display 454 structured to combine the projected image with the view of the environment surrounding the wearer of the device. This allows the user to observe both the surrounding environment and the image projected into prism 454. The prism 454 and the display electronics can be configured to present an opaque or semi-transparent image, or combinations thereof, to achieve various desired image combinations.

It is also noted that, although the embodiment of FIG. 5 shows a extension arm 414 that is joined with band 412 such that it is positioned over the right eye of a user when being worn, other similar embodiments are possible in which a mirror-image of extension arm 414 can be attached on an opposite side of band 412 to make it positionable over the left eye of the user. Depending on the application of device 410 or individual user preferences, it may be desirable to position extension arm 414 on a particular side of the user's head. For example, a right-handed person may prefer having the extension arm 414 on the right side of her head to make interaction with touch-based input 470 easier. In another example, a person may prefer to have the display 454 over a dominant eye for easier interaction with elements presented on display 454 or over a non-dominant eye to make it easier to shift his focus away from elements presented on display 454 when engaged in other activities.

As discussed above, an input device in the form of a touch-based input 470 is also desirably included in extension arm 414. Touch-based input 470 can be a touchpad or trackpad-type device configured to sense at least one of a position and a movement of a finger via capacitive sensing, resistance sensing, or a surface acoustic wave process, among other possibilities. Touch-based input 470 can further be capable of sensing finger movement in a direction parallel or planar to a surface thereof, in a direction normal to the surface, or both, and may also be capable of sensing a level of pressure applied. Touch-based input 470 can be formed having an outer layer of one or more insulating, or dielectric, layers that can be opaque, translucent, or transparent and an inner layer of one or more conducting layers that can be opaque, transparent, or translucent.

In an embodiment, the outer layer of the touch-based input 470 can be a portion of an outer wall 453 of housing 452. This can allow touch-based input to be accessed by the user with device 410 in either of the above-described positions. Further, in a variation configured to rotate, as described above, between the first and second positions, touch-based input 470 can be in generally the same horizontal and/or vertical location regardless of the rotational position of device 410. The arrangement of touch-based input 470 along wall 453 can provide a seamless or uniform incorporation of touch-based input 470 into housing 452. The housing can define an interior cavity for containing the inner layer of the touch-based input 470 and any electrical structures, such as control circuitry, associated therewith. The outer layer of the touch-based input 470 can include the entire wall 453 or a selected operable area 472 in the form of one or more touch-surfaces 470 thereof, as dictated by the size, shape, and position of the inner layer of the touch-based input 470. If a portion of the housing is to be used as the outer layer of the touch-based input 470, then the housing 452 can be made of a dielectric material such as plastic. In an alternative embodiment, the touch-based input can be a discrete element that is mounted in an opening in the housing 452 that includes its own dielectric outer layer, separate from wall 453 to define the operable area within a window or opening through wall 453 in a manner similar to a touchpad on a laptop computer.

In the embodiment shown, touch-based input 470 is positioned on first portion 476 and defines a generally vertical plane that overlies a portion of the side of the user's head. Circuitry can be formed or adjusted to function with a curved outer surface, etc. Accordingly, touch-based input 470 may not be visible to a user of the assembly 410, when it is being worn.

Touch-based input 470, or another type of input, can be used to provide a control function that is executed by extension arm 414, such as by an on-board CPU or a CPU mounted to or within an associated wearable structure, or by a remote device, such as a smartphone or a laptop computer. In an embodiment information related to the control function is viewable by the user on display 454. In one example, the control function is the selection of a menu item. In such an example, a menu with a list of options can be presented on display 454. The user can move a cursor or can scroll through highlighted options by predetermined movement of a finger along touch-based input 470 and can confirm the selection by a different movement, the acceptance of the selection being indicated by the display. Examples of menu item selections can include whether to answer or decline an incoming call on a remotely-linked smartphone or to scroll or zoom-in on a map presented in display.

Additional input structures can be included in extension arm 414. These can include a camera 426, as shown in FIG. 5. The camera can be used to take picture or record a video at the user's discretion. The camera can also be used by the device to obtain an image of the user's view of his or her environment to use in implementing augmented reality functionality. A light sensor can be included in connection with the camera 426, for example, within the same housing feature as camera 426. Such a light sensor can be used by firmware or software associated with the camera 426. As shown in FIG. 5, the camera (and sensor) can be included in a housing 452 positioned within the elbow portion 452 and facing in a direction substantially perpendicular to viewing surface 460 of display 454. In such an arrangement, camera 426 is positioned to face in a direction along the user's line of sight, and the sensor is positioned to sense light within the view of the camera 426. By positioning camera 426 and/or sensor 420 on extension arm 414 along with display 454, the camera and sensor can remain aligned with display 454 in either of the above-described positions.

In an embodiment, button 474 can be configured to receive an input from the user to direct device 410 to capture an image using camera 426 or one of multiple cameras of device 410. In an embodiment, the control circuitry or software within device 410 can allow the user to select one or a plurality of multiple cameras with which to capture an image or "take a picture" before receiving an input using button 474 to actually capture the image using the selected camera. Button 474 can be positioned on extension arm 414 along the top surface 467 of housing 452.

As mentioned previously, extension arm 414 can contain within an interior thereof electronic circuitry such as the circuitry for touch based input 470. In addition extension arm 414 can include control circuitry for the image source associated with display 454, the camera 426, or the sensor 428, or one or more circuit boards including a processor to control display 454, touch based input 470 or to perform other functions for extension arm 414. Extension arm 414 can further include a power source, such as a battery to power the other circuitry. Additionally housing 452 can include memory, a microprocessor or communications devices, such as cellular, short-range wireless (e.g. Bluetooth), or WiFi circuitry for connection to a remote device. Additionally, any such circuitry can be included in band 414 such as in at least enlarged free end 444A, for example in an internal cavity thereof.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A head-wearable device, comprising:
a support structure, including:
   a center support including a nosepiece affixed thereto, wherein the nosepiece is configured to rest on the nose of the a user with the center support being supported over the brow of the user;
   a first side arm extending from a first end of the center support; and
   an earpiece extending from the first side arm and configured to extend behind the ear of the user on the side of the first side arm, the earpiece defining a first portion adjacent the first side arm at a first distance from the center support and a second portion remote from the first side arm and at a second distance from the center support that is greater than the first distance; and
a display affixed to the support structure so as to be positionable adjacent an eye of the user, the display being configured to present information to the user;
wherein the device is configured to be wearable on the head of the user in a first position with the first portion of the earpiece in contact with the ear of the user and the display positioned above a center of a line of sight of the eye of the user and a second position with the second portion of the earpiece in contact with the ear of the user and the display positioned over the center of the line of sight.

2. The device of claim 1, wherein the first distance is such that the nosepiece contacts the nose of the user at a first location when the device is in the first position and such that the nosepiece contacts the nose of the user at a second location when the device is in the second position, the first location being closer to the eye of the user than the second location.

3. The device of claim 1, wherein the display includes a viewing surface, and wherein the first position is such that the viewing surface is positioned at a first angle with respect to the eye of the user and the second position is such that the viewing surface is positioned at a second angle with respect to the eye.

4. The device of claim 3, wherein the first angle is perpendicular to a line from the viewing surface to the focal center of the eye when the device is in the first position, and wherein the second angle is perpendicular to a line from the viewing surface to the center of the eye when the device is in the second position.

5. The device of claim 1, wherein the earpiece includes a high-friction material over at least the second portion thereof.

6. The device of claim 1, wherein the earpiece includes a plurality of ribs oriented generally perpendicular to a direction of the earpiece, the ribs being positioned within the second portion of the earpiece.

7. The device of claim 1, wherein the second portion of the earpiece extends along the earpiece at a length such that the second portion can contact the ear in a plurality of sub-positions.

8. The device of claim 1, wherein the earpiece further includes a notch disposed between the first and second positions, the notch being configured to contact the ear of the user along a top portion thereof when the second portion of the earpiece is also in contact with the ear of the user.

9. The device of claim 1, wherein the earpiece is adjustably affixed with the first side arm such that the first and second distances are adjustable to configure the device to be wearable in the first and second positions.

10. The device of claim 1, wherein the display is affixed to the support structure to be positioned adjacent the first end of the center support.

11. The device of claim 1, further including an extension arm affixed to the support structure so as to extend at least partially along the first side arm on a first side of the center support and to further extend from the first side arm to a display end to which the display is affixed in a given position on a second side of the center support.

12. The device of claim 11, wherein the extension arm further includes a camera located therealong so as to be aligned with the display when the device is in either the first position or the second position.

13. The device of claim 11, wherein the extension arm includes an input device configured to receive an input from the user, the input being related to information presentable on then display.

14. The device of claim 1, wherein the earpiece is included in a housing unit configured for retaining one or more electronic components of the device.

15. The device of claim 1, wherein the nosepiece includes two support arms configured to contact the nose on opposing sides thereof.

16. The device of claim 15, wherein the support arms are adjustable so as to be positionable closer together and farther apart, and wherein such adjustment can be used to configure the device to be wearable in the first and second positions.

17. The device of claim 1, wherein, when the device is moved from the first position to the second position, the earpiece is rotated in a direction away from the ear of the user and, when the device is in the second position, the first portion of the earpiece is not in contact with the ear of the user.

18. A head-wearable device, comprising:
a support structure, including:

a center support including a nosepiece affixed thereto, wherein the nosepiece is configured to rest on the nose of the a user with the center support being supported over the brow of the user;

a first side arm extending from a first end of the center support; and an earpiece extending from the first side arm and configured to extend behind the ear of the user on the side of the first side arm, the earpiece defining a first portion adjacent the first side arm at a first distance from the center support and a second portion remote from the first side arm and at a second distance from the center support that is greater than the first distance; and a display affixed to the support structure so as to be positionable adjacent an eye of the user, the display being configured to present information to the user;

wherein the device is configured to be wearable on the head of the user in a first position with the first portion of the earpiece in contact with the ear of the user and the display in a first vertical position with respect to the eye and a second position with the second portion of the earpiece in contact with the ear of the user and the display in a second vertical position with respect to the eye, the first position being higher than the second position.

19. The device of claim 18, wherein the first vertical position is such that the eye of the user must be directed upward to focus on information presentable in the display, and wherein the second position is such that the eye can focus on information presentable on the display when centrally oriented.

20. The device of claim 18, wherein the first vertical position is configured such that information presentable on the display does not obstruct the user's vision, and wherein the second vertical position is configured such that information presentable on the display can be comfortably viewed by the user for more than 90 seconds.

21. A head-wearable device, comprising:

a support structure, including:

a center support including a nosepiece affixed thereto, wherein the nosepiece is configured to rest on the nose of the a user with the center support being supported over the brow of the user;

a first side arm extending from a first end of the center support; and a housing extending from the first side arm and including an earpiece configured to extend behind the ear of the user on the side of the first side arm, the earpiece defining a first portion adjacent the side arm at a first distance from the center support and a second portion remote from the side arm and at a second distance from the center support that is greater than the first distance, the housing being further configured to retain an electronic component therein; and an extension arm affixed to the support structure so as to extend at least partially along the first side arm on a first side of the center support and to further extend from the first side arm to a display end including a display thereon in a position on a second side of the center support, the display being positionable adjacent an eye of the user;

wherein the device is configured to be wearable on the head of the user in a first position with the first portion of the earpiece in contact with the ear of the user and the display in a first vertical position with respect to the eye and a second position with the second portion of the earpiece in contact with the ear of the user and the display in a second vertical position with respect to the eye, the first position being higher than the second position.

\* \* \* \* \*